United States Patent
Katahira

(10) Patent No.: US 8,619,302 B2
(45) Date of Patent: Dec. 31, 2013

(54) IMAGE READING APPARATUS, CONTROL METHOD THEREOF AND IMAGE READING SYSTEM

(75) Inventor: Yoshiaki Katahira, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 13/173,996

(22) Filed: Jun. 30, 2011

(65) Prior Publication Data

US 2012/0026556 A1    Feb. 2, 2012

(30) Foreign Application Priority Data

Aug. 2, 2010    (JP) .................................. 2010-173967

(51) Int. Cl.
*G06F 15/00* (2006.01)

(52) U.S. Cl.
USPC ............................ 358/1.15; 358/527; 358/407

(58) Field of Classification Search
None
See application file for complete search history.

(56) References Cited

U.S. PATENT DOCUMENTS

| | | | |
|---|---|---|---|
| 7,839,522 B2 | 11/2010 | Ohara et al. .................. | 358/1.15 |
| 7,843,586 B2 | 11/2010 | Ferlitsch ....................... | 358/1.15 |
| 8,169,638 B2 | 5/2012 | Fukui et al. ................... | 358/1.15 |
| 2006/0187483 A1* | 8/2006 | Baba ............................. | 358/1.15 |
| 2008/0079985 A1* | 4/2008 | Ferlitsch ....................... | 358/1.15 |
| 2008/0117458 A1* | 5/2008 | Pyo et al. ...................... | 358/1.15 |
| 2008/0252919 A1 | 10/2008 | Okayama et al. ............. | 358/1.15 |
| 2008/0297828 A1 | 12/2008 | Niikura et al. ................ | 358/1.15 |
| 2009/0128844 A1* | 5/2009 | Kondo et al. ................. | 358/1.15 |

FOREIGN PATENT DOCUMENTS

| | | |
|---|---|---|
| CN | 1770812 A | 5/2006 |
| CN | 1874404 A | 12/2006 |
| JP | 5-75692 A | 3/1993 |
| JP | 2008-85978 A | 4/2008 |
| KR | 10-2007-0065865 A | 6/2007 |

* cited by examiner

*Primary Examiner* — Twyler Haskins
*Assistant Examiner* — Helen Q Zong
(74) *Attorney, Agent, or Firm* — Fitzpatrick, Cella, Harper & Scinto

(57) ABSTRACT

An image reading apparatus, system and control method are provide, wherein specific information used to specify a setting associated with reading set by a host PC is received from the host PC, and both the received specific information and identification information used to identify the host PC having transmitted the specific information are registered in association with a specific key. Upon an operation of the specific key, a read instruction issue request is sent to the host PC in accordance with the specific information registered in association with the specific key, an image is read in accordance with a read instruction sent from the host PC in response to the read instruction issue request sent by the host PC, and image data obtained from the image is transmitted from the image reading apparatus to the host PC.

13 Claims, 15 Drawing Sheets

FIG. 6

| PROFILE SETTING |||| 
|---|---|---|---|
| 602 | 603 | 604 | 605 |
| SCAN 1 | SCAN 2 | SCAN 3 | SCAN 4 |

READING SETTING

| | | |
|---|---|---|
| BUTTON NAME | SCAN 1 | 606 |
| DOCUMENT TYPE | COLOR | 607 |
| FILE TYPE | JPEG | 608 |
| DOCUMENT SIZE | A4 | 609 |
| RESOLUTION | 300dpi | 610 |

STORAGE SETTING

| | | |
|---|---|---|
| STORAGE LOCATION | C:¥DATA¥User1 | 611 |
| FILE NAME | FileA | 612 |

FIG. 10A

| | |
|---|---|
| 1001 — | SHORTCUT KEY 1 |
| 1002 — | DESTINATION Host PC NAME: NONE |
| 1003 — | CONNECTION I/F:  NO DESIGNATION |
| 1004 — | PROFILE DESIGNATION:  NO DESIGNATION |

FIG. 10B

| | |
|---|---|
| 1011 — | SHORTCUT KEY 1 |
| 1012 — | DESTINATION Host PC NAME: Host 1 |
| 1013 — | CONNECTION I/F:  NETWORK I/F |
| 1014 — | PROFILE DESIGNATION:  PROFILE 1 |

FIG. 10C

| SHORTCUT KEY 1 |
|---|
| DESTINATION Host PC NAME: Host 1 |
| CONNECTION I/F:  USB I/F |
| PROFILE DESIGNATION:  PROFILE 1 |

FIG. 10D

| SHORTCUT KEY 1 |
|---|
| DESTINATION Host PC NAME: NONE |
| CONNECTION I/F:  USB I/F |
| PROFILE DESIGNATION:  NO DESIGNATION |

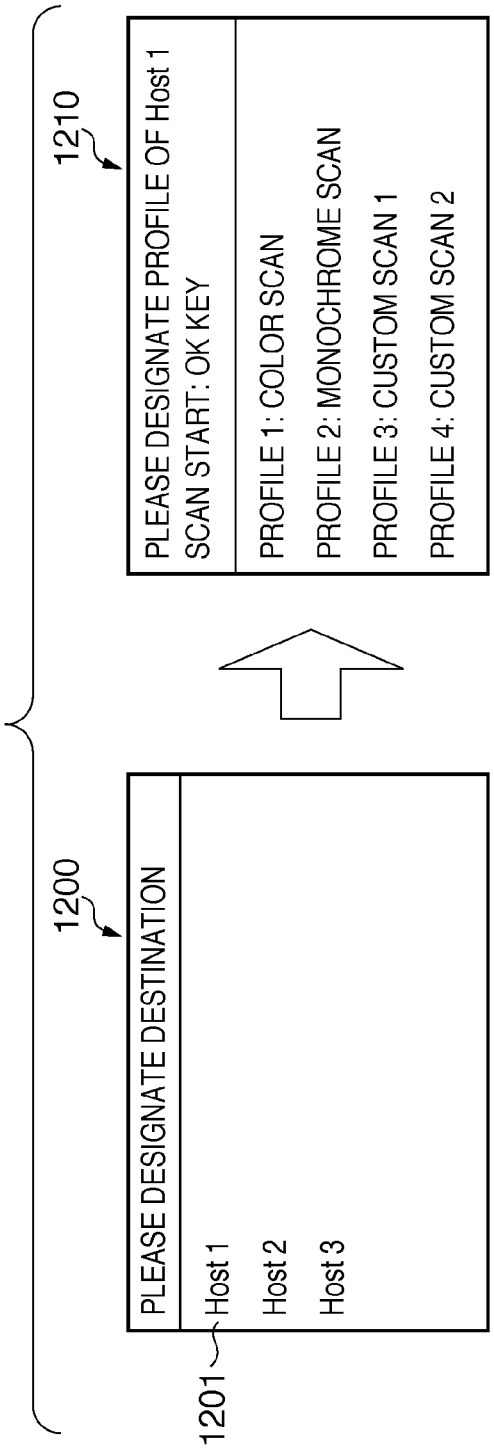
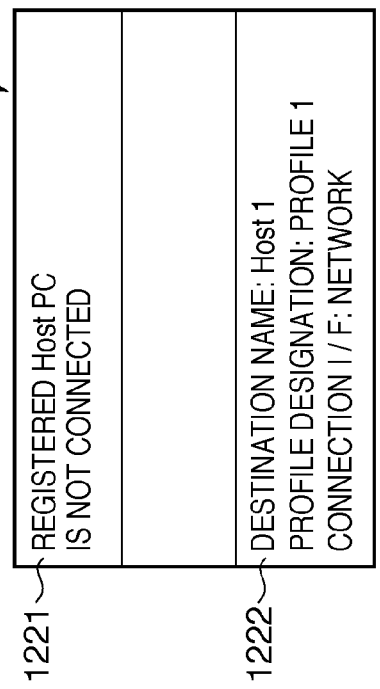
FIG. 12A
FIG. 12B

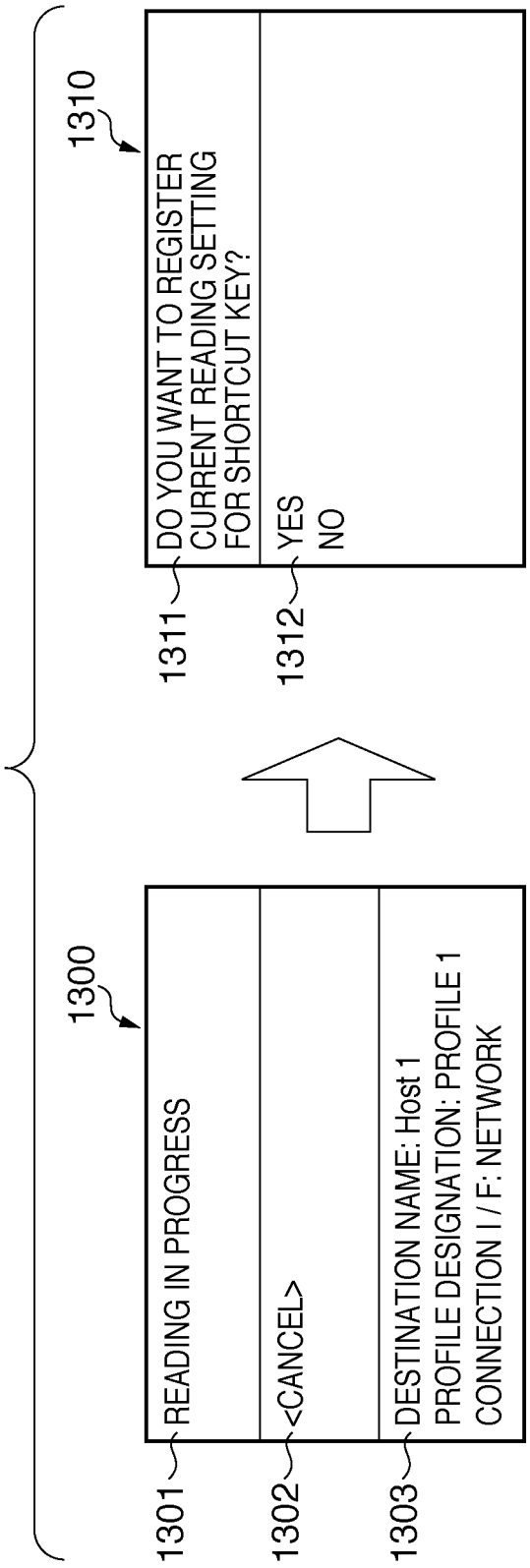

IMAGE READING APPARATUS, CONTROL METHOD THEREOF AND IMAGE READING SYSTEM

BACKGROUND OF THE INVENTION

1. Field of the Invention

The present invention relates to a technique for reading an image in accordance with a read instruction issued from an information processing apparatus, and transmitting the read image data to the information processing apparatus.

2. Description of the Related Art

In recent years, inexpensive scanners and MFPs (multi-function peripheral having a reading, printing and facsimile function and the like) use the pseudo Push Scan scheme (a method which uses a host PC and a driver) to transmit a scanned image. In the pseudo Push Scan scheme, a request to "execute a Pull Scan by itself" is issued from an MFP to a host PC with a Pull Scan driver installed on it. Then, the MFP reads a document in accordance with a Pull Scan instruction from the host PC, and transmits the image data obtained by reading to the host PC. The host PC processes the image data received from the MFP by a Pull Scan performed at that time, based on an image processing method designated in the Pull Scan, and stores the processed data at a predetermined storage destination. With these procedures, image data can be transmitted from the MFP to the host PC and stored in a desired image format in accordance with an instruction from the MFP, thus implementing a Push Scan from the MFP in a pseudo manner.

In contrast to an MFP which performs a Push Scan on a stand-alone basis, the above-described pseudo Push Scan scheme offers advantages that:

it is possible to reduce the cost because the MFP need not support many protocols, it is possible to improve the usability because the MFP need not perform complicated network settings.

Also, to execute the pseudo Push Scan from the MFP, the user performs an operation of selecting a desired one of options corresponding to the name of a host PC displayed on a console panel of the MFP and a scan parameter set (to be referred to as a profile hereinafter) of the host PC. On the other hand, Japanese Patent Laid-Open No. 5-75692 proposes a technique which can register a shortcut function for omitting the operation of the MFP.

To omit an operation in a pseudo Push Scan, which uses the console panel of the MFP mentioned above, it is desirable to issue an instruction to perform the pseudo Push Scan by a shortcut key, but this poses the following problems.

A host PC with a Pull Scan driver installed on it is often connected to the MFP via a network or an interface such as a USB interface. In this case, the user of the MFP must select both a host PC for each interface and a profile for the selected host PC, thus degrading the usability. Also, omission of an operation of selecting a host PC results in, for example, erroneous transmission. Especially a user who always selects the same host PC wants to omit both an operation of selecting a host PC for each interface and an operation of selecting a profile.

SUMMARY OF THE INVENTION

An aspect of the present invention is to eliminate the above-mentioned problems with the conventional technology.

The feature of this embodiment lies in providing a technique of registering both information of an information processing apparatus that is the transmission destination of read image data, and specific information used to specify a setting associated with reading, in association with a specific key so that an image read instruction is issued from the information processing apparatus to an image reading apparatus simply by operating the registered key.

According to an aspect of the present invention, there is provided an image reading apparatus for reading an image in accordance with a read instruction issued from an information processing apparatus, and transmitting the read image data to the information processing apparatus, the apparatus comprising: a reception unit that receives, from the information processing apparatus, specific information used to specify a setting associated with reading set by the information processing apparatus; a register unit that registers both the specific information received by the reception unit, and identification information used to identify the information processing apparatus having transmitted the specific information, in association with a specific key; a sending unit that sends a read instruction issue request to the information processing apparatus indicated in the identification information, in accordance with the specific information registered in association with the specific key, in response to an operation of the specific key; and an image transmission unit that reads an image in accordance with a read instruction sent from the information processing apparatus in response to the read instruction issue request sent by the sending unit, and transmits image data obtained from the image to the information processing apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 depicts a view illustrating an example of a screen displayed upon pressing a "Set" key in FIG. 5;

FIGS. 10A to 10D depict schematic views of registration details registered in a nonvolatile memory;

FIGS. 12A and 12B depict views illustrating examples of display of the display unit of the multi-function peripheral according to the embodiment;

FIG. 13 depicts a view illustrating an example of display of the display unit of the multi-function peripheral according to the embodiment;

DESCRIPTION OF THE EMBODIMENTS

An embodiment of the present invention will now be described hereinafter in detail, with reference to the accompanying drawings. It is to be understood that the following embodiment is not intended to limit the claims of the present invention, and that not all of the combinations of the aspects that are described according to the following embodiment are necessarily required with respect to the unit to solve the problems according to the present invention. Although a multi-function peripheral will be taken as an example of an image reading apparatus in this embodiment, the image reading apparatus may be, for example, a scanner apparatus or a multi-function peripheral or printer having a scanner function.

Figure 1:
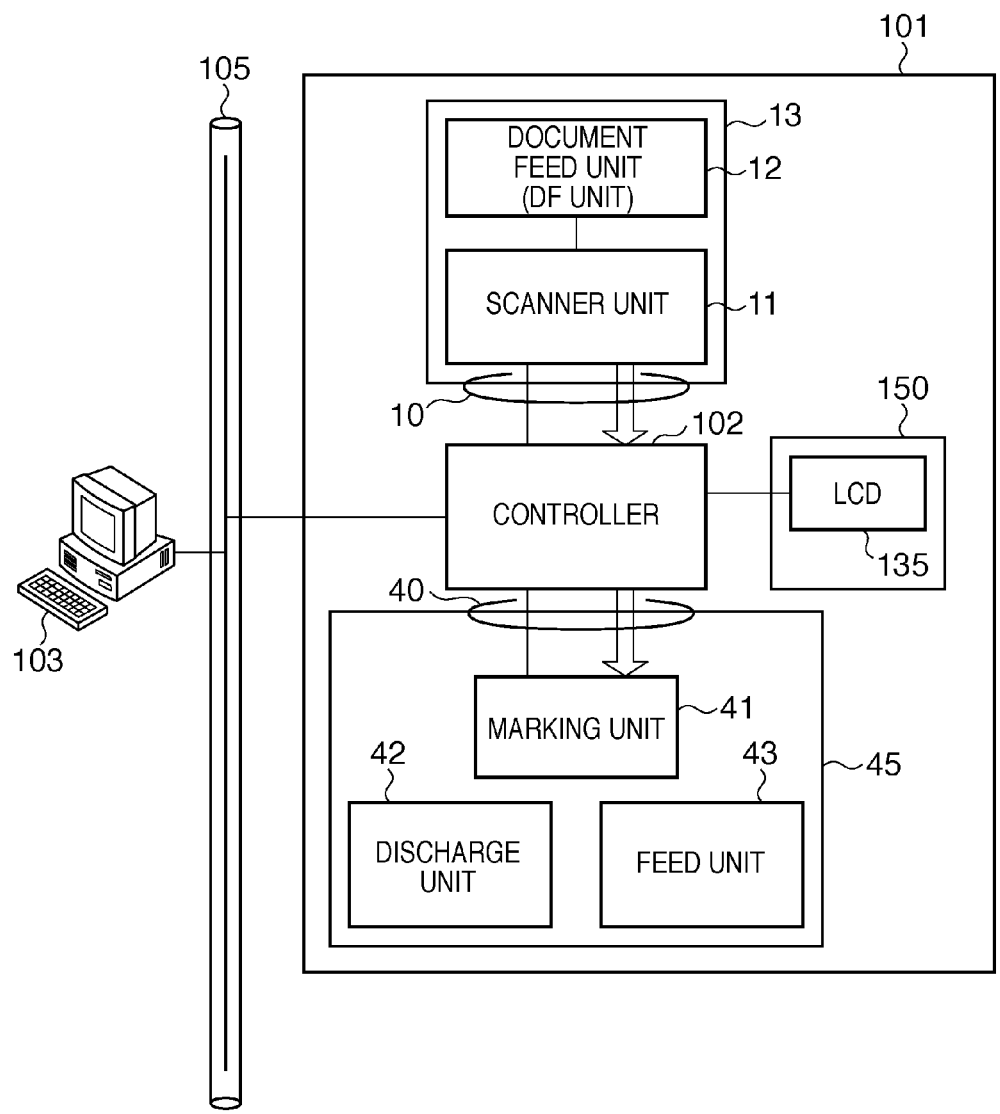
FIG. 1 is a block diagram showing the configuration of an MFP (Multi-Function Peripheral) according to an embodiment of the present invention.

FIG. 1 is a block diagram showing the configuration of an MFP (Multi-Function Peripheral) 101 which exemplifies an image reading apparatus included in an image reading system according to an embodiment of the present invention. This MFP has, for example, a scanner function for reading a document to obtain image data, a printer function for receiving and printing print data from a PC, and a facsimile transmission/reception function.

A reader unit 13 optically reads an image of a document, and converts it into image data. The reader unit 13 includes a scanner unit 11 having a function of reading a document, and a document feed unit 12 having a function of conveying the document. A printer unit 45 conveys a recording paper (sheet), prints image data on this sheet as a visible image, and discharges it outside the apparatus. The printer unit 45 includes a feed unit 43 including a plurality of types of paper cassettes, a marking unit 41 having a function of transferring and fixing image data on a sheet, and a discharge unit 42 having a function of sorting and stapling the printed sheets and discharging it. A controller 102 is electrically connected to the reader unit 13 and printer unit 45, and is also connected to a host PC (information processing apparatus) 103 via a network 105. This system transmits image data read by the image reading apparatus (multi-function peripheral) 101 to the host PC 103 using a pseudo Push Scan function that utilizes a Pull Scan function of the host PC 103.

The controller 102 provides a copy function for controlling the reader unit 13 via a scanner I/F 10 to acquire image data of a document, and controlling the printer unit 45 via a printer I/F 40 to print the image data on a sheet. The controller 102 also provides a function of transmitting image data read by the reader unit 13 to other information devices such as the host PC 103 via the network 105. A console unit 150 is connected to the controller 102, and includes a display unit 135 and hardware keys (to be described later), thereby providing a user I/F used to operate the multi-function peripheral 101.

Figure 2:
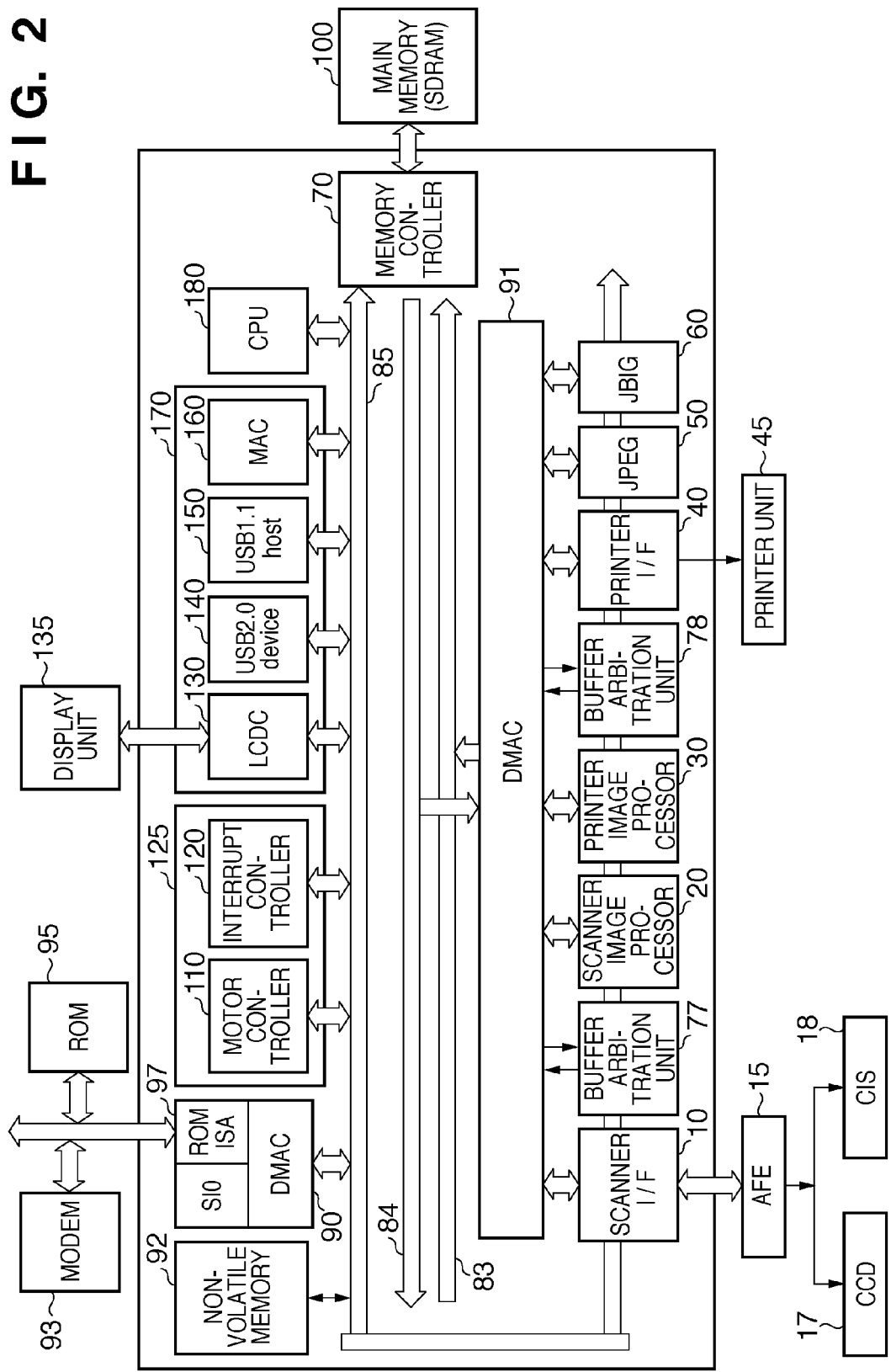
FIG. 2 is a block diagram for explaining the configuration of a controller of the MFP.

FIG. 2 is a block diagram for explaining the configuration of the controller 102.

The scanner interface (I/F) 10 is connected to a CCD 17 and CIS (Contact Image Sensor) 18 via an AFE (Analog Front End) 15, and can receive read data into the controller 102 without using individual dedicated circuits. The scanner I/F 10 is compatible with the CCD 17 and CIS 18 as image reading devices, and performs processing of inputting signals from these image reading devices. The image data input at this time are transferred using DMA by a memory controller 70, and expanded in a main memory 100. A scanner image processor 20 executes image processing corresponding to an image processing operation mode (for example, a color copy, a monochrome copy, a color scan, or a monochrome scan) for the image data expanded in the main memory 100 by the processing of the scanner I/F 10. A buffer arbitration unit 77 arbitrates between data writing and reading when data is exchanged between the scanner I/F 10 and the scanner image processor 20 via a ring buffer area in the main memory 100. A printer image processor 30 performs region edition and resolution conversion of input image data, and outputs the obtained image data to the printer unit 45. The printer I/F 40 outputs image data obtained as a result of image processing to the printer unit 45 connected via the I/F 40. A buffer arbitration unit 78 arbitrates between data writing and reading when data is exchanged between the printer image processor 30 and the printer I/F 40 via a ring buffer area in the main memory 100. Although the buffer arbitration units 77 and 78 have the same basic block configuration, they use different control methods depending on the purpose of use. A JPEG module 50 and JBIG module 60 are processors which execute image data compression and expansion processing that complies with a predetermined standard.

The memory controller 70 connects to each other a first bus 83 and second bus 84 in an image processing system and a third bus 85 in a computer system, and performs data transfer control for writing and reading data into and from the main memory (SDRAM) 100. A DMAC (DMA Controller) 90 is connected to a ROM 95 via a ROMISA 97 in cooperation with the memory controller 70. The DMAC 90 serves to exchange data between the main memory 100 and an external device or a communication & user interface controller 170, and generates and sets predetermined address information used for DMA control. A DMAC (DMA Controller) 91 serves to exchange data between the main memory 100 and the image processors 20 and 30 in cooperation with the memory controller 70, and generates and sets predetermined address information used for DMA control. For example, the DMAC 91 generates address information, used for DMA transfer of image data read by the scanner I/F 10 to the main memory 100, for each DMA channel in accordance with whether the CCD 17 or the CIS 18 is used. Also, the DMAC 91 functions as a unit which performs DMA control between the main memory 100 and the image processors 20 and 30, such as DMA transfer of image data expanded in the main memory 100 to the scanner image processor 20, in cooperation with the memory controller 70.

The ROM 95 stores control parameters and control program data which are appropriate for the individual image reading devices (the CCD 17 and CIS 18). This allows processing of inputting image data corresponding to the individual data output formats of the CCD 17 and CIS 18, thus obviating the need to provide dedicated interface circuits. Also, the ROM 95 is capable of storing data in a nonvolatile manner, and therefore stores data regardless of the ON/OFF state of the power. A nonvolatile memory 92 is used to store, for example, the profile (setting information) of a scan executed in cooperation with a host PC (to be described later). The first bus 83 transmits image data read out from the main memory 100 to each processor of the image processing system. The second bus 84 transmits data read out from each processor of the image processing system to the main memory 100. The first and second buses 83 and 84 are used in pairs to exchange image data between the main memory 100 and each image processing block. The third bus 85 connects a CPU 180, the communication & user interface controller 170, a mechatronics controller 125, control registers in the image processors, and the DMAC 90 to each other. The mechatronics controller 125 includes a motor controller 110, and an interrupt controller 120 which performs timing control for controlling the motor driving timing and the processing synchronization of the image processing system. A display controller 130 performs display control for displaying, for example, the various settings and processing status of the image processing apparatus on the display unit 135. Reference numerals 140 and 150 denote USB interfaces which allow connection to peripheral devices. An MAC (Media Access Controller) 160 controls, for example, the optimum timing at which data is transmitted to a device connected to it (access). This unit is also used for communication with other devices (host PC 103) via the network 105. The CPU 180 controls the overall operation of the multi-function peripheral 101. A modem 93 is used to transmit/receive a facsimile signal via a public line.

Figure 3:
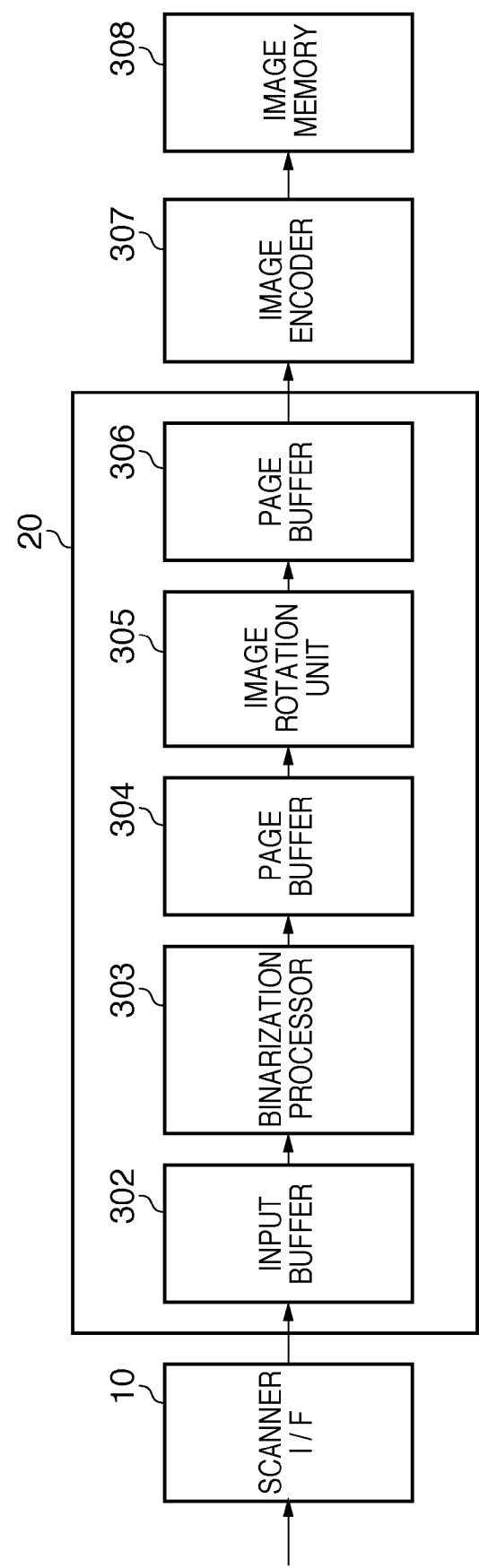
FIG. 3 is a block diagram for explaining the configuration of a scanner image processor of the MFP.

FIG. 3 is a block diagram for explaining the configuration of the scanner image processor 20.

Image data input via the scanner I/F 10 is temporarily stored in an input buffer 302. At this moment, the input image data is processed as image data with 1 byte per pixel if it is monochrome image data, while the input image data is processed as multilevel image data with 3 bytes per pixel if it is color image data. Note that the input buffer 302 need not collectively store data of one page, and need only store data with a size corresponding to the unit of binarization processing of a binarization processor 303 in a subsequent stage. The binarization processor 303 converts multilevel image data into binary image data for each predetermined amount of data, and stores them in a page buffer 304. An image rotation unit 305 rotates image data. At this time, the CPU 180 performs a setting, used to control image data rotation, for the image rotation unit 305 via the third bus 85. This image data rotation setting includes, for example, rotation/nonrotation and the rotation direction/angle. The image data having undergone image rotation processing is stored in a page buffer 306. After that, the binary image data stored in the page buffer 306 undergoes encode processing by an image encoder 307, and is stored in an image memory 308. Note that this encode processing is done by the JBIG module 60 for monochrome image data, while it is done by the JPEG module 50 for color image data.

In this embodiment, to perform a Pull Scan and a pseudo Push Scan, the host PC 103 performs most types of image processing. Therefore, image data obtained by scanning is directly stored in the image memory 308 without both rotation by the image rotation unit 305 and encode processing. Although the image memory 308 is assumed to be provided in the main memory 100, the above-mentioned image data may be stored in the HDD, depending on the hardware configuration. Note also that data transfer between the above-mentioned memories or buffers and other image processing blocks is done using DMA transfer by the DMAC 91 and memory controller 70.

An image data transmission function will be described next.

The CPU 180 executes a control program for implementing a protocol and transmission specification which are stored in the ROM 95. More specifically, image data stored in the image memory 308 undergoes, for example, encoding and packet header addition, and is transmitted to an information device on a network, such as the host PC 103, via the third bus 85 and MAC 160. In this embodiment, TCP/IP is used to perform communication for a pseudo Push Scan on TCP/IP. A sequence (procedural details) for a pseudo Push Scan will be described later.

Figure 4:
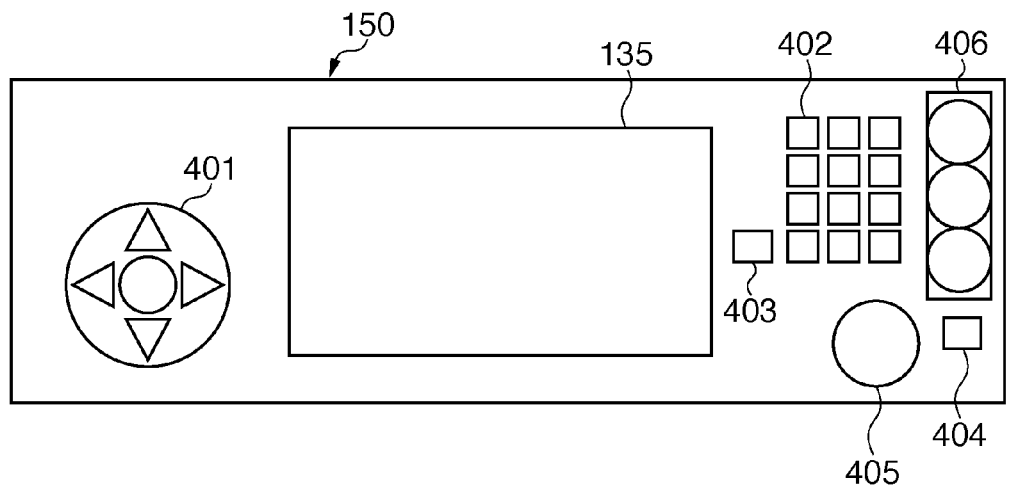
FIG. 4 depicts a top view of a console unit of the MFP according to the embodiment.

FIG. 4 depicts a top view of the console unit 150 of the MFP according to the embodiment.

The console unit 150 includes the display unit 135, a menu selection key 401, a numeric keypad 402, a reset key 403, a stop key 404, a start key 405, and pseudo Push Scan shortcut keys 406. In this embodiment, the keys 401 to 405 are hardware keys.

The display unit 135 performs display in accordance with the control of the display controller 130. The menu selection key 401 includes keys used to scroll up, down, left, and right so as to select a menu displayed on the display unit 135, and a key used to confirm a selected item. The numeric keypad 402 is used to directly input a numerical value such as the number of copies. The reset key 403 is used to return the setting value to its initial value by clearing the status of a setting in progress. The start key 405 is used to issue an instruction to start various jobs. The stop key 404 is used to issue an instruction to stop the started job. The pseudo Push Scan shortcut keys 406 are used to issue an instruction to start a pseudo Push Scan. Each of the pseudo Push Scan shortcut keys 406 is associated with a profile which defines, for example, the type and size of a document to be read, the resolution, the image data storage destination, and the file name. Therefore, the user need only press one of the pseudo Push Scan shortcut keys 406 to make it possible to execute a pseudo Push Scan function that utilizes a Pull Scan function of a host corresponding to this key. This allows processing of reading a document by the multi-function peripheral 101 to acquire image data, transmitting this image data to a host PC, and storing this image data at a predetermined location in the host PC.

A Pull Scan driver on the host PC 103 will be described next. A sequence for information exchange between the multi-function peripheral 101 and the host PC 103 will be described later, and a reading setting by the Pull Scan driver will be described herein.

Figure 5:
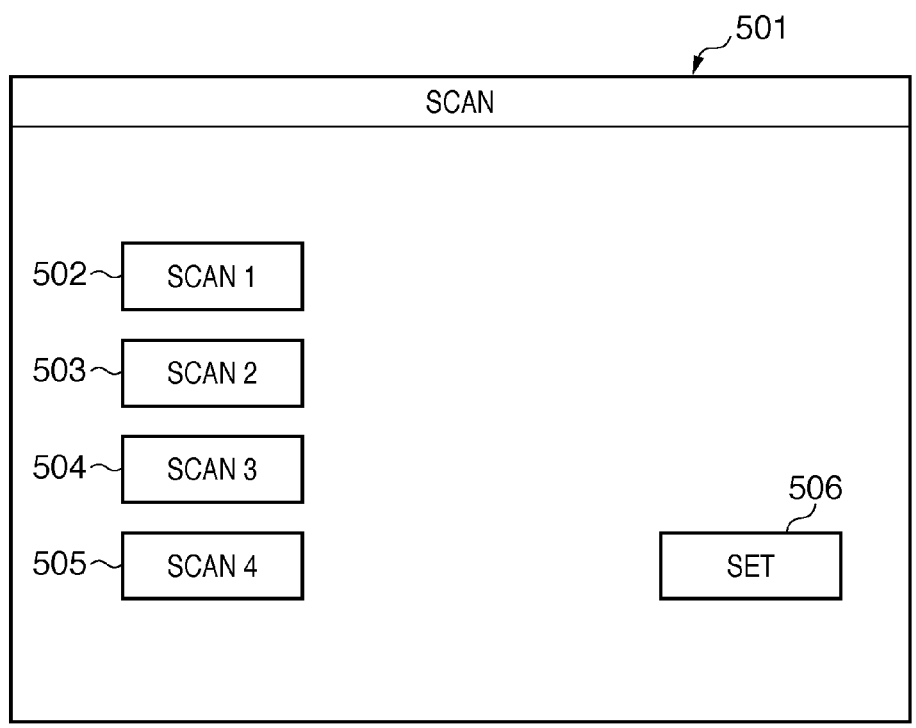
FIG. 5 depicts a view illustrating an example of a screen displayed on a display unit of a host PC according to the embodiment.

FIG. 5 depicts a view illustrating an example of a screen displayed on a display unit 501 of the host PC according to the embodiment.

FIG. 5 illustrates an example of a screen displayed on the display unit 501 of the host PC 103 when a Pull Scan is performed from the host PC 103. Buttons 502 to 505 are assigned with profiles which define different types of reading. Upon pressing one of the buttons 502 to 505, the multi-function peripheral 101 starts to read a document, and transmits image data obtained by reading the document to the host PC 103.

The detailed different types of reading settings that can be performed using the buttons 502 to 505 will be described next with reference to FIG. 6.

FIG. 6 depicts a view illustrating an example of a screen displayed upon pressing a set key 506 on the screen shown in FIG. 5.

Upon pressing one of buttons 602 to 605 on the screen shown in FIG. 6, a setting of a corresponding profile is selected. In, for example, the custom setting of a "Scan 1" key, the button 602 is pressed. FIG. 6 shows the state in which the "Scan 1" button 602 is pressed. With this selection operation, a setting value previously input for "Scan 1" by the user, or a default setting value is displayed in each field denoted by reference numerals 606 to 612. The user can modify these setting values to desired values.

For example, in the field 606, the profile name can be modified. As will be described later, upon modifying the profile name in the field 606, the modified profile name is also reflected on the screen of the display unit 135 of the multi-function peripheral 101.

In the field 607, the type of document in reading can be selected. In this embodiment, monochrome, monochrome (OCR), grayscale, color, or color (a magazine or a catalog) can be selected as an option for the type of document. Referring to FIG. 6, "Color" is set. In the field 608, the type of file in storing image data of the document can be selected. In this case, a file format such as JPEG, TIFF, PDF, or BMP can be designated. In the field 609, the size of the document to be scanned is designated. In this case, "A4" size is designated. In the field 610, the resolution in scanning is designated. In this case, a resolution of "300 dpi" is designated. In the field 611, a location (a path in the host PC 103) at which the image data is to be stored is designated. In this case, "C¥DATA¥User1" is set. In the field 612, the name of a storage file is designated. In this case, "FileA" is designated.

In the above-mentioned way, based on the setting values of the fields 607 to 610, image processing is performed for image data read by the multi-function peripheral 101 to obtain desired image data. Note that the image processing in this case may be performed by either the multi-function peripheral 101 or the host PC 103. In this embodiment, the host PC 103 performs the image processing.

In a pseudo Push Scan, image data starts to be transmitted from the multi-function peripheral 101 to the host PC 103 upon the start of a Pull Scan from the multi-function peripheral 101, that is, upon pressing one of the buttons 502 to 505 shown in FIG. 5 by the host PC 103.

Figure 7:
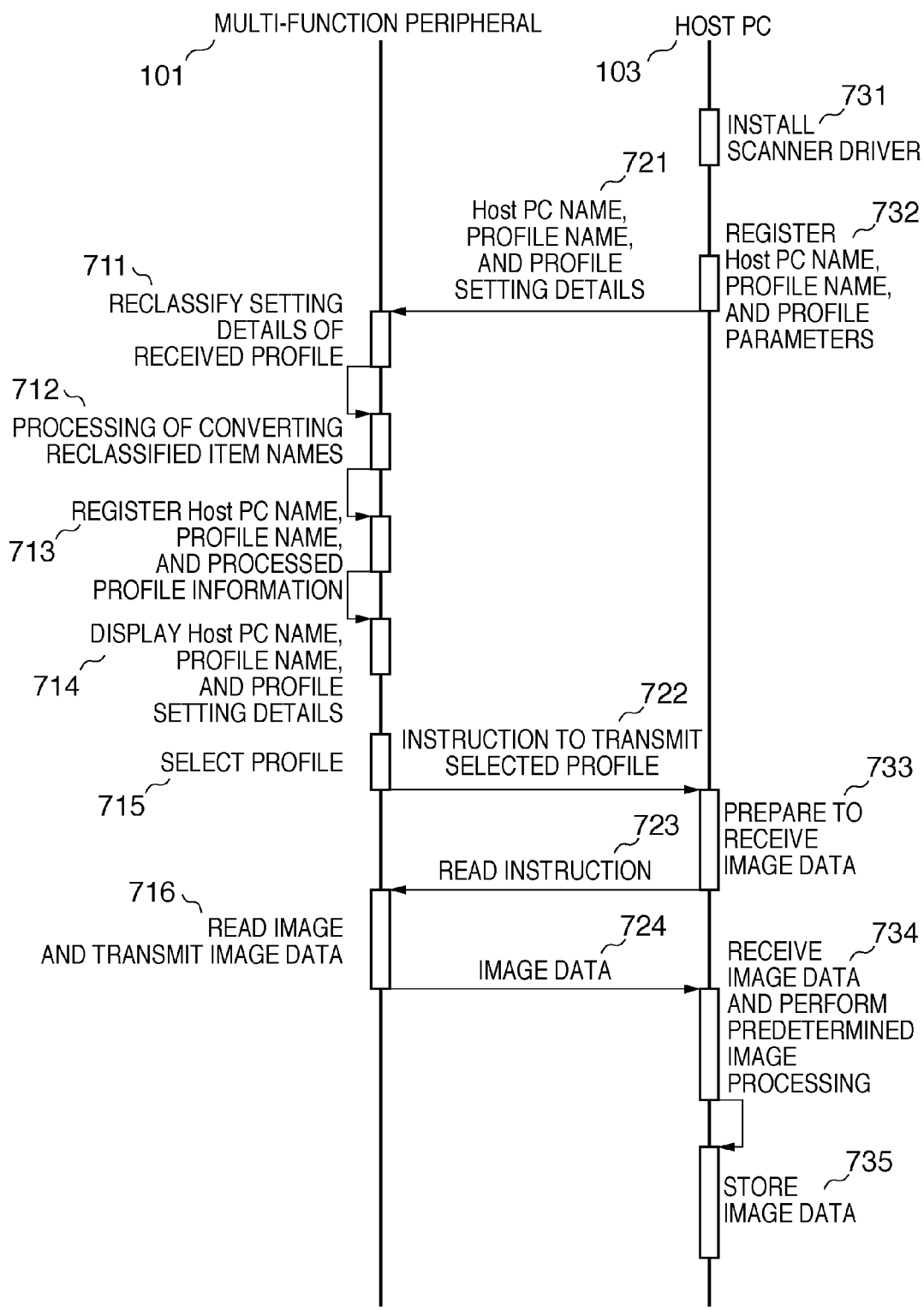
FIG. 7 depicts a view describing a sequence chart for explaining information exchange between the multi-function peripheral and the host PC.

FIG. 7 is a sequence chart for explaining information exchange between the multi-function peripheral 101 and the host PC 103 according to the embodiment.

In step 731, a Pull Scan driver is installed on the host PC 103. This allows the host PC 103 to perform a Pull Scan. In step 732, the host PC 103 registers the host PC name, the profile name, and the profile setting details, and transmits these details to the multi-function peripheral 101, as indicated by reference numeral 721. This step is executed at one of:

the timing at which a driver is installed on the host PC 103 or the timing at which the host PC 103 is started, the timing at which the profile setting of the Pull Scan driver on the host PC 103 is modified, the timing at which the host PC 103 changes the log-on user when it has a multiuser interface such as Windows® available from Microsoft Corporation.

Reference numeral 721 indicates information which is transmitted from the host PC 103 to the multi-function peripheral 101, and includes a host PC name, a profile name, and profile setting details. Also, when a plurality of profiles are present, as indicated by reference numerals 502 to 505 in FIG. 5, information corresponding to these plurality of profiles is transmitted.

In steps 711 and 712, the multi-function peripheral 101 receive the information 721 from the host PC 103. Simultaneously with reception of the information including the above-mentioned details, the multi-function peripheral 101 reclassifies the profile setting details for use in display on the multi-function peripheral 101, and converts the item names. It is a common practice that the profile setting screen of the host PC 103 shown in FIG. 6 has a space sufficient to display texts or comments, so user friendliness improves when a setting which uses detailed display is possible. However, the display unit 135 of the multi-function peripheral 101 can display only a few characters, so it is more preferable to describe the profile attributes using only a short string of characters because this improves the profile listing performance, thus improving the usability. Also, it is effective in terms of the limit of the number of characters to group several items to be displayed within the range in which the user can perceive them. Therefore, in display on the display unit 135 of the multi-function peripheral 101, display items must be edited so as to be displayed in a format simpler than in display on the host PC 103. These types of processing will be described in detail later.

In step 713, the host PC name, the profile name, and the reclassified and converted item names obtained in steps 711 and 712 are stored in the multi-function peripheral 101. In step 714, the host PC name, the profile name, and the profile setting details are displayed on the display unit 135. In this case, a menu screen is formed so that the details stored in step 713 can be displayed in a selection menu on the display unit 135. At this time, the multi-function peripheral 101 displays a screen shown in FIG. 9 on the display unit 135. The screen shown in FIG. 9 will be described later together with a flowchart that explains processing by the multi-function peripheral 101, which is shown in FIG. 8.

In step 715, when the user operates a shortcut key 406 corresponding to a specific profile displayed on the display unit 135 in step 714 to select this profile, the multi-function peripheral 101 requests the host PC 103 to perform a Pull Scan, in accordance with the selected profile. Reference numeral 722 indicates a transmission instruction to the host PC 103, and the profile selected in step 715. In step 733, the host PC 103 receives the Pull Scan request issued from the multi-function peripheral 101, and starts to prepare for a Pull Scan. At this time, the host PC 103 determines, based on the transmitted details 722, which one of the profiles associated with the buttons 502 to 505 shown in FIG. 5 is used to start a Pull Scan.

Reference numeral 723 indicates a scan start instruction issued by the host PC 103 to notify the multi-function peripheral 101 of the start of a Pull Scan, in response to the issued Pull Scan request. In step 716, the multi-function peripheral 101 starts to read a document based on the designated details 723. Image data 724 obtained by reading a document in step 716 is transmitted to the host PC 103. In step 734, the host PC 103 receives the transmitted image data 724, and performs image processing based on the parameters of the designated profile. Also, in this embodiment, a folder on the hard disk of the host PC 103 is designated as a storage destination. Therefore, in step 735, the image data having undergone image processing in step 734 is stored in the designated folder ("User1" in the example shown in FIG. 6) upon attaching the designated name (File A) to it.

Figure 8:
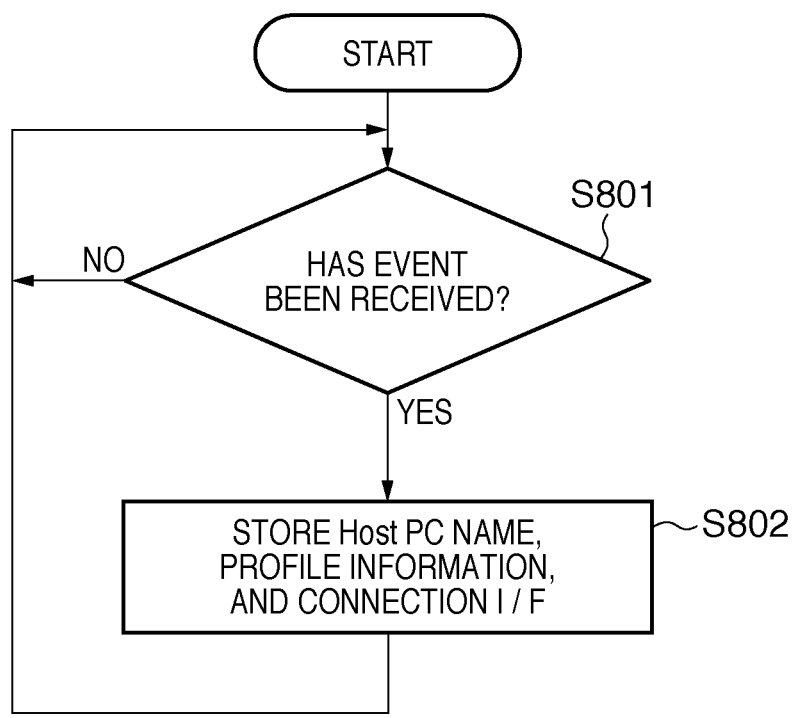
FIG. 8 is a flowchart describing a procedure for receiving and storing information from the host PC by the multi-function peripheral.

FIG. 8 is a flowchart describing a procedure of the multi-function peripheral 101 that receives and stores information from the host PC 103 according to the embodiment. This processing is implemented by using the CPU 180 to execute a program stored in the ROM 95.

First, in step S801, the CPU 180 determines whether information (the host PC name and profile information) has been received from the host PC 103 via the USB I/F 140 or network I/F 160. If YES is determined in step S801, the process advances to step S802; otherwise, processing in step S801 is repeatedly executed. In step S802, the CPU 180 acquires a host PC name and profile information from the information received in step S801, and stores them in the main memory 100. Further, the CPU 180 acquires information of the connection I/F between the multi-function peripheral 101 and the host PC 103 from interface information indicating whether the I/F received in step S801 is the USB I/F 140 or the network I/F 160, stores it in the main memory 100, and then executes processing in step S801.

In this manner, the CPU 180 stores, in the main memory 100, the latest information of the host PC 103 which is always connected to the multi-function peripheral 101 via the USB I/F 140 or the network I/F 160.

Figure 9:
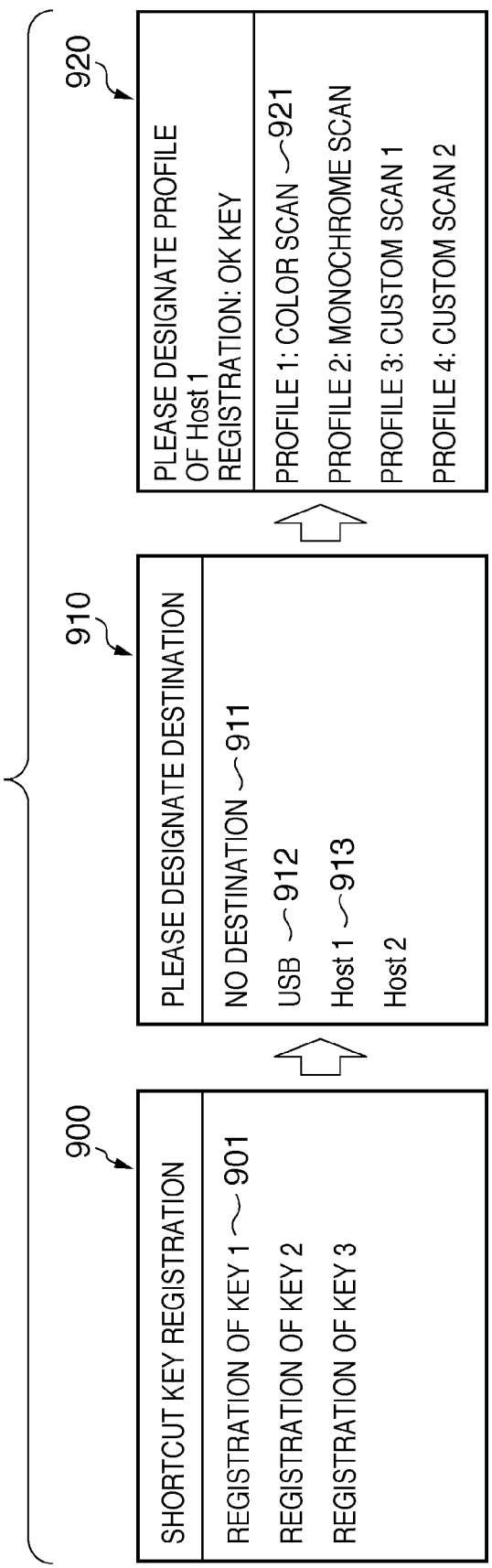
FIG. 9 depicts a view describing a chart showing the screen flow upon registering a shortcut key displayed on a display unit by the multi-function peripheral.

FIG. 9 is a chart showing the screen flow upon registering a shortcut key displayed on the display unit 135 by the CPU 180 of the multi-function peripheral 101.

Reference numeral 900 denotes a shortcut registration key selection screen. In this case, this screen displays three types of registration keys (options): "Registration of Key 1", "Registration of Key 2", and "Registration of Key 3" in correspondence with the three shortcut keys 406 shown in FIG. 4.

A destination designation screen 910 exemplifies a screen displayed upon selecting one option on the shortcut registration key selection screen 900. In this case, "Registration of Key 1" 901 (corresponding to, for example, the uppermost key among the shortcut keys 406 shown in FIG. 4) is assumed to be selected. Reference numeral 911 denotes a selection item for selecting "No Destination". Reference numeral 912 denotes a selection item for designating that the destination is a host PC connected to the USB I/F 140. Reference numeral 913 denotes the name of a host PC connected via the network I/F 160, among the pieces of information held in the main memory 100 in accordance with the procedure having been described with reference to a flowchart shown in FIG. 8. In this case, "Host 1" and "Host 2" are connected to the multi-function peripheral 101.

A profile selection screen 920 is a screen displayed upon selecting, for example, "Host 1" among the options displayed on the destination designation screen 910. Reference numeral 921 denotes an option for the profile, which is exemplified by the profile of a host PC with a host name "Host 1", among the pieces of information stored in accordance with a flowchart shown in FIG. 8. In this way, the profile of a Pull Scan function implemented by the selected host PC is registered in the nonvolatile memory 92.

FIGS. 10A to 10D depict schematic views of the registration details of shortcut key 1 stored in the nonvolatile memory 92.

Figure 11:
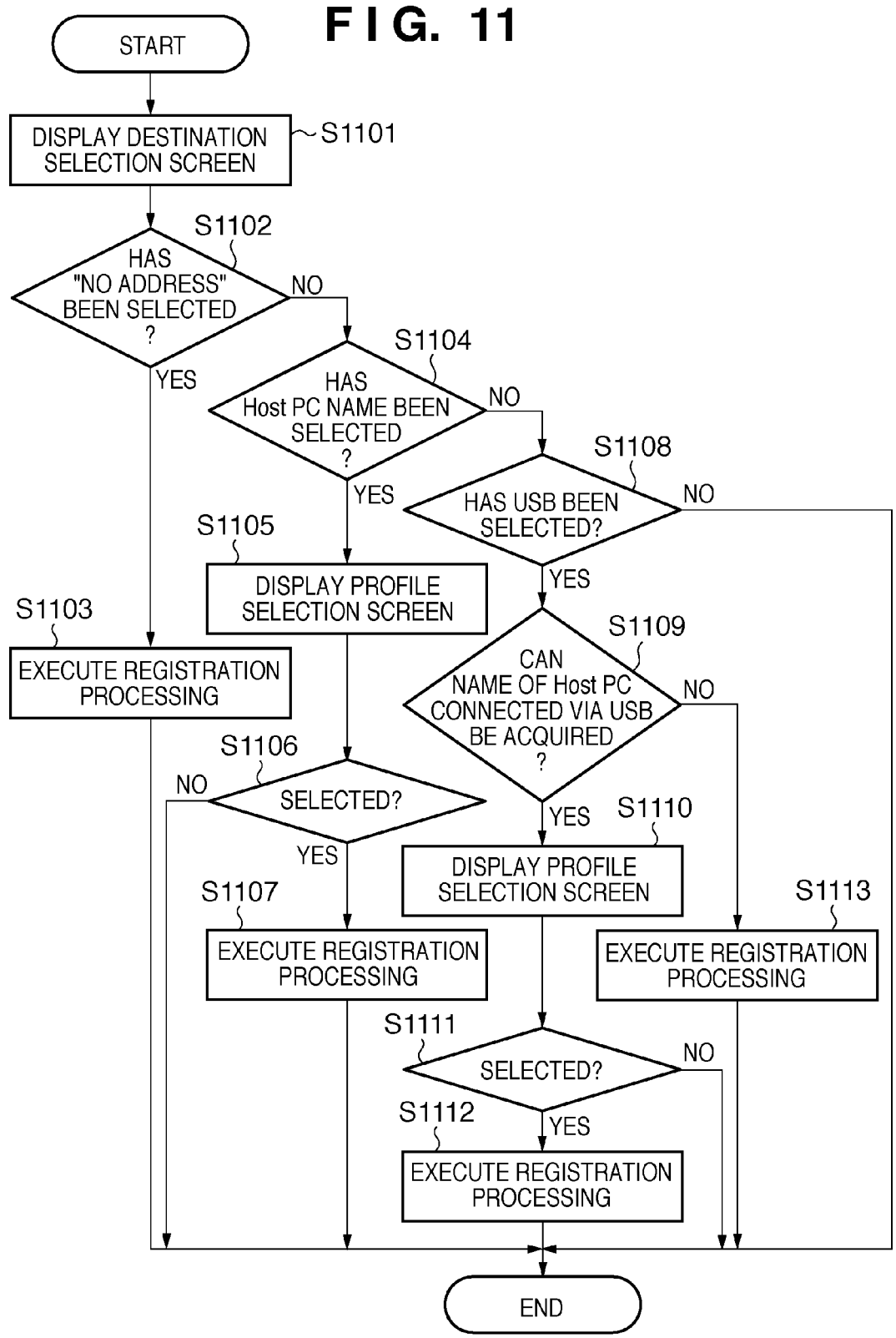
FIG. 11 is a flowchart describing a procedure for shortcut key registration processing by the multi-function peripheral.

FIG. 11 is a flowchart describing a procedure for shortcut key registration processing by the multi-function peripheral 101 according to the embodiment. This processing is implemented by using the CPU 180 to execute a program stored in the ROM 95.

This processing starts upon selecting pseudo Push Scan shortcut key registration from the console unit 150. First, in step S1101, the CPU 180 displays the shortcut registration key selection screen 900 shown in FIG. 9. Referring to an example shown in FIG. 9, the destination designation screen 910 is displayed upon selecting "Registration of Key 1" 901. The destination designation screen 910 displays "No Destination" 911, the USB 912, and the name 913 of a host PC connected via the network I/F, among the host PC names held in the main memory 100 in accordance with the procedure shown in FIG. 8. The process then advances to step S1102 in which the CPU 180 detects an input via the menu selection key 401 of the console unit 150 to determine whether an option for the destination has been selected. If it is determined in step S1102 that "No Destination" 911 is selected, the process advances to step S1103; otherwise, the process advances to step S1104. In step S1103, the CPU 180 registers "No Destination" for shortcut key 1, stores it in the nonvolatile memory 92, and the process ends.

This case corresponds to FIG. 10A. In this case, for "Shortcut Key 1" 1001, "No Designation" 1002 is registered as the destination host PC name that is the destination information selected on the destination designation screen 910 shown in FIG. 9. Therefore, "No Designation" 1003 is registered as the information of the connection I/F with the host PC, and "No Designation" 1004 is registered as the profile designation. These pieces of information are stored in the nonvolatile memory 92.

In step S1104, the CPU 180 determines whether the destination selected in step S1102 is a host PC connected via the network I/F 160. If YES is determined in step S1104, the process advances to step S1105; otherwise, the process advances to step S1108. In step S1105, the CPU 180 displays an option for the profile information, which is held in the main memory 100 in accordance with the procedure shown in FIG. 8 and provided to the selected host PC, as exemplified by the profile selection screen 920, and the process advances to step S1106. In step S1106, the CPU 180 detects an input via the menu selection key 401 of the console unit 150 to determine whether an option for the profile information has been selected. If YES is determined in step S1106, the process advances to step S1107; otherwise, the process ends. In step S1107, the CPU 180 stores, for "Shortcut Key 1", the destination host PC name selected in step S1104, the network I/F as the connection I/F, and the profile setting selected in step S1106, and the process ends.

This case corresponds to FIG. 10B. In this case, "Host 1" 1012 which is the destination information selected on the destination designation screen 910, "Network I/F" 1013 which is the connection I/F information, and "Profile 1" 1014 selected on the profile selection screen 920 are registered in the nonvolatile memory 92 for "Shortcut Key 1" 1011.

If a destination other than a host PC connected via the network I/F 160 is selected in step S1104, the process advances to step S1108 in which the CPU 180 determines whether the destination selected in step S1102 is a USB. If YES is determined in step S1102, the process advances to step S1109; otherwise, the process ends. In step S1109, the CPU 180 determines the presence/absence of the name of a host PC connected via a USB I/F, among the host PC names held in the main memory 100. If a host PC connected via a USB I/F is present, the process advances to step S1110; otherwise, the process advances to step S1113.

In step S1110, the CPU 180 displays, on the profile selection screen 920, an option for the profile information, which is provided to the host PC connected via the USB I/F, and the process advances to step S1111. In step S1111, the CPU 180 detects an input via the menu selection key 401 of the console unit 150 to determine whether an option for the profile information has been selected. If YES is determined in step S1111, the process advances to step S1112; otherwise, the process ends. In step S1112, the CPU 180 stores the host PC name, the USB I/F, and the reading setting in the nonvolatile memory 92 for "Shortcut Key 1", and the process ends.

This case corresponds to FIG. 10C. FIG. 10C is different only in connection I/F information from FIG. 10B, and is the same in other details as FIG. 10B.

If it is determined in step S1109 that no host PC connected via a USB I/F is present, the process advances to step S1113. In step S1113, the CPU 180 registers, for "Shortcut Key 1", "No Destination Host Name", a "USB I/F" as the connection I/F information, and "No Profile", and the process ends. This case corresponds to FIG. 10D.

With the above-mentioned processing, a target host PC, its connection interface, and a profile used to read image data set on this PC can be registered for a shortcut key on the multi-function peripheral 101.

FIGS. 12A and 12B depict views illustrating examples of display of the display unit 135 of the multi-function peripheral 101 according to the embodiment. FIGS. 12A and 12B exemplify the screen flow displayed before the start of scanning after detecting pressing of a shortcut key.

FIG. 13 depicts a view illustrating an example of display of the display unit 135 of the multi-function peripheral 101 according to the embodiment. FIG. 13 exemplifies the screen flow displayed after the start of scanning.

Figure 14A:
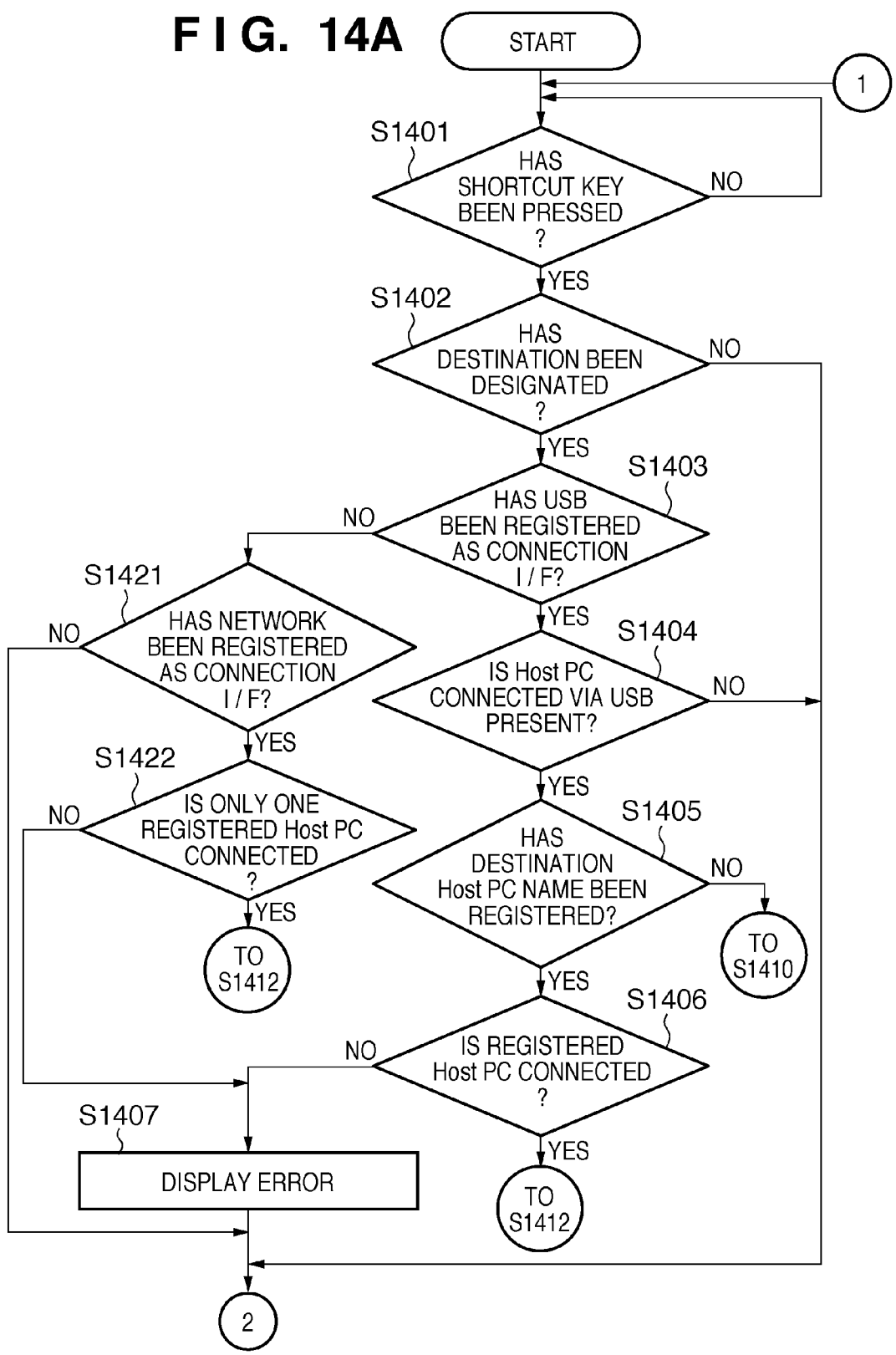
FIGS. 14A and 14B are flowcharts describing a procedure for pseudo Push Scan processing in the multi-function peripheral.
Figure 14B:
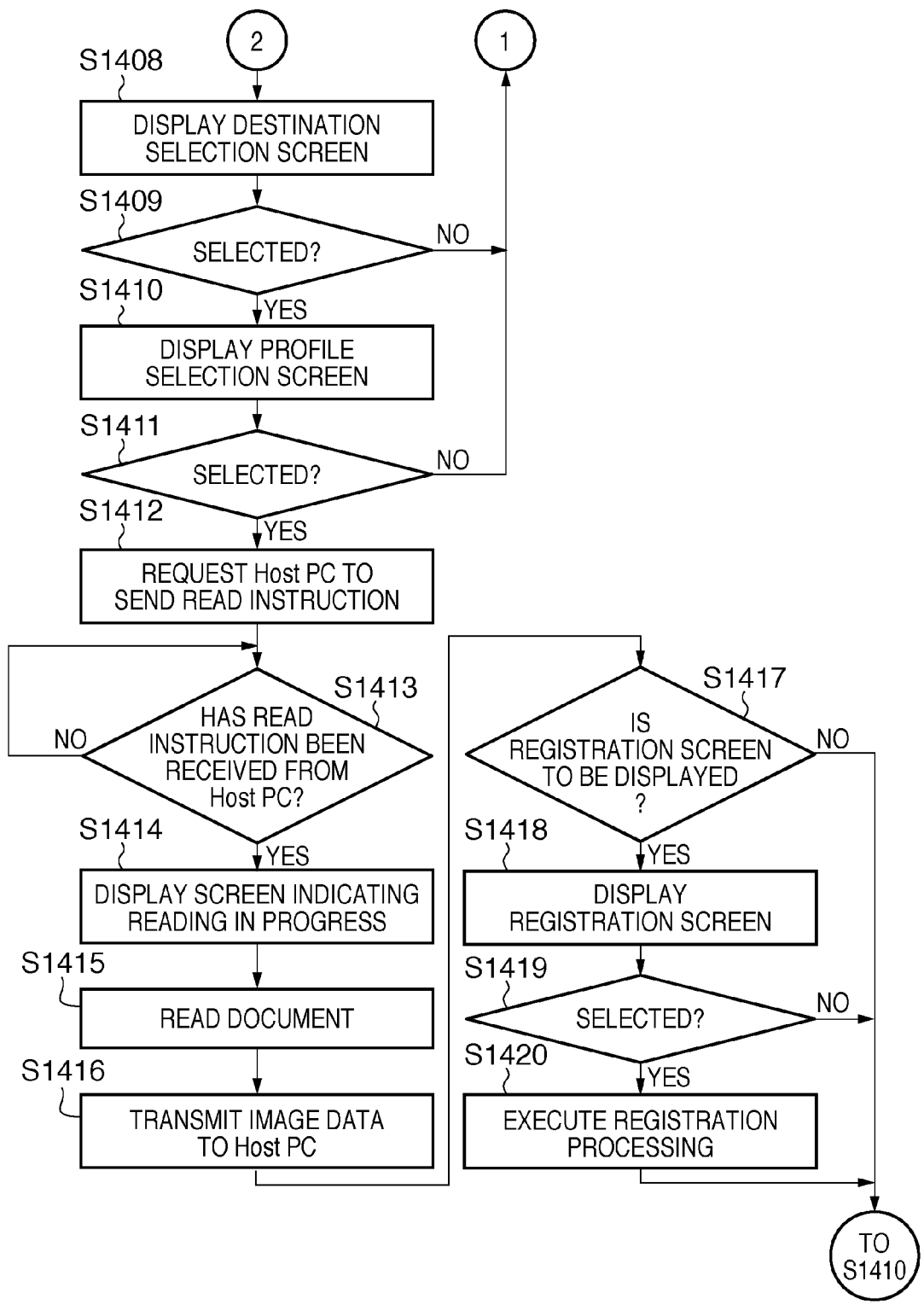

FIGS. 14A and 14B are flowcharts describing a procedure for pseudo Push Scan processing in the multi-function peripheral 101 according to the embodiment. This processing is implemented by using the CPU 180 to execute a program stored in the ROM 95.

First, in step S1401, the CPU 180 determines whether one of the pseudo Push Scan shortcut keys 406 has been pressed. If it is determined in step S1401 that one shortcut key has been pressed, the process advances to step S1402 in which it is determined whether a destination has been registered for this shortcut key. These operations are done because it is often the case that no destination host name has been designated, as has been described earlier with reference to FIGS. 10A and 10D. If YES is determined in step S1402, the process advances to step S1403; otherwise, the process advances to step S1408. In step S1403, it is determined whether the connection I/F is a USB. If YES is determined in step S1403, the process advances to step S1404; otherwise (if the connection I/F is a network I/F), the process advances to step S1421. In step S1404, the CPU 180 determines whether a host PC connected via a USB I/F is present. If YES is determined in step S1404, the process advances to step S1405 in which it is determined whether the name of this host PC has been registered. If NO is determined in step S1405, the CPU 180 selects the host PC confirmed in step S1404, and the process advances to step S1410. If YES is determined in step S1405, the process advances to step S1406 in which it is determined whether the multi-function peripheral 101 is connected to the registered host PC. If YES is determined in step S1406, the process advances to step S1412; otherwise, the process advances to step S1407. In step S1407, the CPU 180 displays, on the display unit 135, a message indicating that the registered host PC is not found on a network or via a USB interface, and the process advances to step S1408.

In step S1407, a message 1221 indicating that the registered host PC is not connected, and information 1222 of the host PC stored in the main memory 100 is displayed on the display unit 135, as indicated by reference numeral 1220 in FIG. 12B, and the process advances to step S1408.

In step S1408, the CPU 180 displays an option for the destination, and the process advances to step S1409.

Referring to an example shown in FIG. 12A, a list 1201 of the names of host PCs connected via a network I/F are displayed, among the host PC names held in the main memory 100, as indicated by reference numeral 1200. In this example, no host PC connected via a USB I/F is present, so no host name connected via a USB I/F is indicated in the list 1201. If, for example, "Host 1" is selected in the list 1201, a profile selection screen, as indicated by reference numeral 1210, is displayed.

In step S1409, the CPU 180 detects an input via the menu selection key 401 of the console unit 150 to determine whether an option for the destination has been selected. If YES is determined in step S1409, the process advances to step S1410; otherwise, the process advances to step S1401. In step S1410, the CPU 180 displays, on a reading setting selection screen, an option for the profile information, which is held in the main memory 100 and provided to the host PC specified in step S1409, and the process advances to step S1411.

Reference numeral 1210 in FIG. 12A denotes a profile selection screen displayed upon selecting, for example, "Host 1" as the host PC. In step S1411, the CPU 180 detects an input via the menu selection key 401 of the console unit 150 to determine whether an option for the profile information has been selected. If YES is determined in step S1411, the process advances to step S1412. In step S1412, the CPU 180 issues a request to the selected host PC 103 to perform a Pull Scan by itself. At this time, information indicating which one of profiles of the Pull Scan driver on the host PC is used to perform a Pull Scan is transmitted as well, and the process advances to step S1413.

In step S1413, the CPU 180 waits for a Pull Scan instruction from the host PC. When the CPU 180 receives a Pull Scan instruction from the host PC, the process advances to step S1414 in which the CPU 180 displays a screen indicating "Reading in Progress" on the display unit 135, and the process advances to step S1415.

FIG. 13 depicts a view illustrating an example of the screen displayed in step S1414.

"Reading in Progress" 1301, a cancel option 1302, and information 1303 of the registered host PC are displayed on the display unit 135, as indicated by reference numeral 1300.

In step S1415, the CPU 180 causes a scanner to scan a document to read a document image. The process then advances to step S1416 in which the CPU 180 transmits the read image data to the host PC, and the process advances to step S1417.

In step S1417, the CPU 180 determines whether unregistered information for the shortcut key remains. If YES is determined in step S1417, the process advances to step S1418; otherwise, the process advances to step S1410. In step S1418, the CPU 180 displays, on the display unit 135, a screen for selecting whether the details registered for the shortcut key pressed in step S1401 are to be updated using the details of a Pull Scan executed at the immediately preceding time, and the process advances to step S1419.

This screen is exemplified by a registration selection screen 1310 shown in FIG. 13.

Referring to FIG. 13, a message 1311 for inquiring whether to register the current setting for the shortcut key is displayed, and a response ("YES"/"NO") 1312 is displayed as well.

In step S1419, the CPU 180 detects an input via the menu selection key 401 of the console unit 150 to determine whether registration or non-registration has been selected. If it is determined in step S1419 that registration ("YES") has been selected, the process advances to step S1420. In step S1420, the CPU 180 updates the registered information of the shortcut key, pressed in step S1401, using, for example, the destination host PC name indicating a pseudo Push Scan performed at the immediately preceding time, the connection I/F information, and profile selection, and the process advances to step S1410. If it is determined in step S1419 that "NO" has been selected, the process advances to step S1410 without updating the registered information.

If it is determined in step S1403 that the connection I/F information is not a USB, the process advances to step S1421 in which the CPU 180 determines whether the interface specified in the information that is registered for the shortcut key and is acquired in step S1402 is a network I/F. If NO is determined in step S1403, the process advances to step S1408; otherwise, the process advances to step S1422. In step S1422, the CPU 180 determines whether there is only one host PC which has the same destination host PC name as that specified in the information that is registered for the shortcut key and is acquired in step S1402, and uses a network I/F as its connection I/F. That is, the CPU 180 determines whether the information held in the main memory 100 includes information corresponding to only one such host PC. If YES is determined in step S1422, the process advances to step S1412; otherwise (if no corresponding host PC is present or a plurality of corresponding host PCs are present), the process advances to step S1407 in which error display processing is executed.

With this processing, the pseudo Push Scan shortcut key 406 of the console unit 150 of the multi-function peripheral 101 need only be pressed to make it possible to execute pseudo Push Scan processing corresponding to the profile set on a PC registered for this shortcut key in cooperation with this PC. It is also possible to update the details registered for the pseudo Push Scan shortcut key 406 in accordance with an actually used profile.

Figure 15:
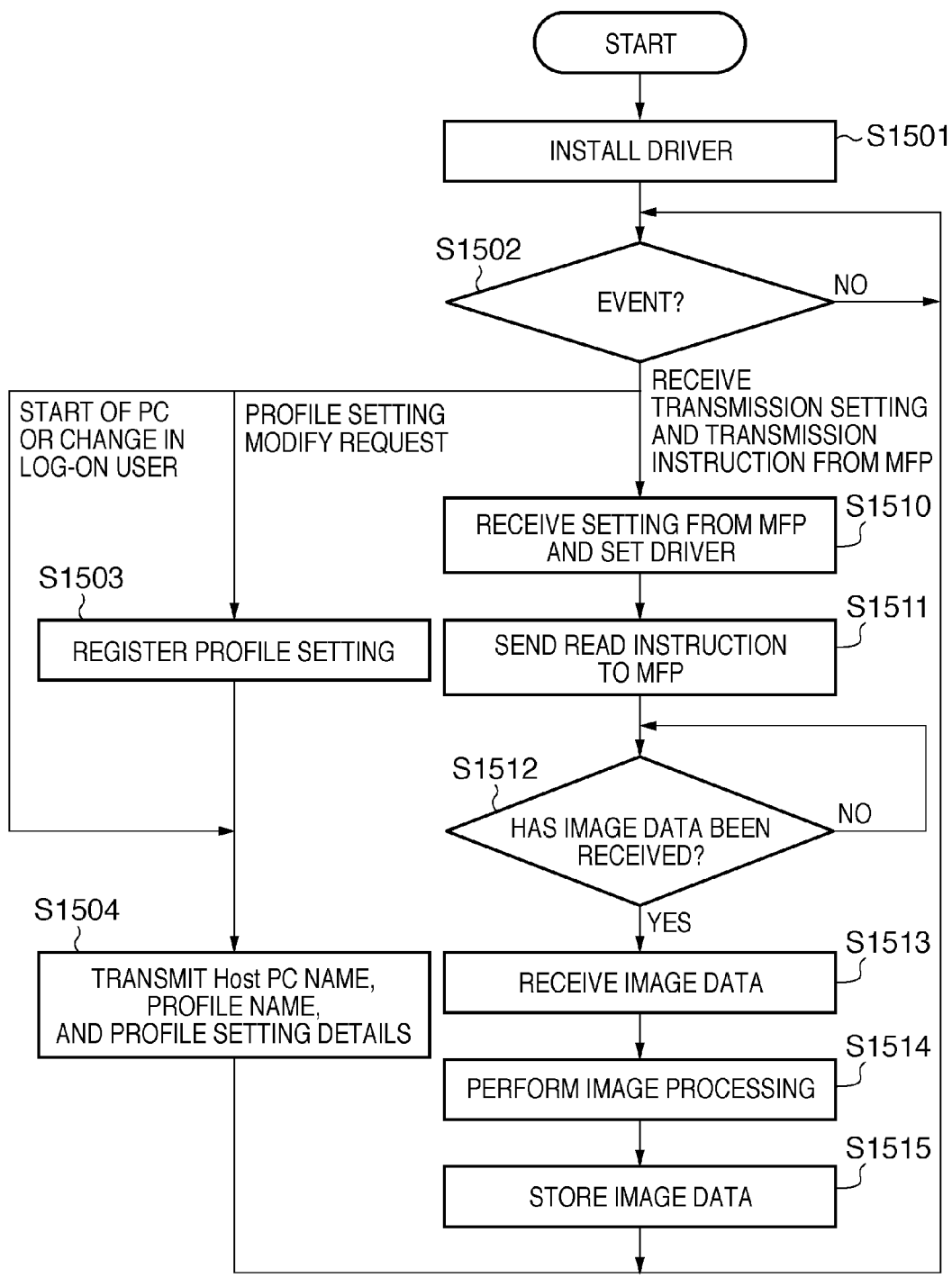
FIG. 15 is a flowchart describing a procedure for processing by the host PC according to the embodiment.

FIG. 15 is a flowchart describing a procedure for processing by the host PC 103 according to the embodiment.

In step S1501, a Pull Scan driver is installed on the host PC 103, and need not be installed more than once as long as it is not erased. Therefore, processing in step S1501 is necessary only for the first time, and can normally be omitted. The process then advances to step S1502 in which the host PC 103 waits for the occurrence of an event. The target events are:

an event in which the host PC 103 is started or the log-on user is changed, an event in which a modification in profile setting on the Pull Scan driver is requested, an event in which the multi-function peripheral 101 prompts the host PC 103 to perform a Pull Scan (provides notification to that effect).

If an event in which a modification in profile setting on the Pull Scan driver is requested has occurred in step S1502, the process advances to step S1503 in which the host PC 103 stores the details modified using the screen shown in FIG. 6 by the user. The process then advances to step S1504 in which the host PC 103 transmits the host PC name, the profile name, and the profile setting details to the multi-function peripheral 101 (the details 721 in FIG. 7). Thus, the multi-function peripheral 101 can create a menu (FIG. 9) to be displayed in registering the pseudo Push Scan shortcut key 406 or a menu (FIG. 12A, 12B, or 13) to be displayed in a pseudo Push Scan.

If an event in which the host PC 103 is started or the log-on user is changed has occurred in step S1502, the process advances to step S1504. This is done in order to notify the multi-function peripheral 101 of the profile information provided to the host PC 103 to create a menu (FIG. 9) to be displayed in pseudo Push Scan shortcut key registration or a menu (FIG. 12A, 12B, or 13) to be displayed in a pseudo Push Scan.

If an event in which the multi-function peripheral 101 prompts the host PC 103 to perform a Pull Scan (provides notification to that effect) has occurred in step S1502, the process advances to step S1510. In step S1510, the host PC 103 receives a Pull Scan start request and selection profile information in performing a Pull Scan from the multi-function peripheral 101 (the details 722 in FIG. 7). The host PC 103 selects a profile (one of the buttons 502 to 505 shown in FIG. 5) from the received information. The process then advances to step S1511 in which the host PC 103 sends a Pull Scan instruction to the multi-function peripheral 101, based on the setting performed in step S1510. In step S1512, the host PC 103 stands by for transmission of image data from the multi-function peripheral 101. If it is determined in step S1512 that image data has been transmitted, the process advances to step S1513 in which the host PC 103 receives the image data transmitted from the multi-function peripheral 101. In step S1514, the host PC 103 performs image processing on the received image data based on the setting performed in step S1510. The process then advances to step S1515 in which the host PC 103 acquires the storage location in the field 611 and file name in the filed 612 of the image data from the selection profile information received in step S1510, and stores the processed image data in the designated storage location upon attaching the designated file name to it.

Although a network (TCP/IP) and a USB are used for communication in this embodiment, the same processing is applicable irrespective of which one is used.

The details displayed on the screens, shown in FIGS. 9, 12A, 12B, and FIG. 13, displayed on the display unit 135 of the multi-function peripheral 101 merely give examples, and other display forms are also applicable.

Although hardware keys are used as pseudo Push Scan shortcut keys, as shown in FIG. 4, in this embodiment, software keys displayed on the display unit 135 shown in FIG. 4 may be used.

Although a host PC name, a profile name, and profile setting details are received from the host PC 103 and stored in this embodiment, all of these pieces of information need not always be received or stored. At least identification information (for example, a host PC name) used to identify a host PC, and profile specific information (for example, a profile name) used to specify a profile, need only be received or stored, be assigned to each shortcut key, and be registered.

According to this embodiment, it is possible to considerably improve the operability of a read instruction in the image reading apparatus while preventing erroneous transmission.

Aspects of the present invention can also be realized by a computer of a system or apparatus (or devices such as a CPU or MPU) that reads out and executes a program recorded on a memory device to perform the functions of the above-described embodiment(s), and by a method, which are the steps of performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-173967, filed Aug. 2, 2010, which is hereby incorporated by reference herein in its entirety.

What is claimed is:

1. An image reading apparatus for reading an image and transmitting the read image data to an information processing apparatus in accordance with a read instruction issued from the information processing apparatus, the apparatus comprising:

a register unit that registers identification information of an information processing apparatus corresponding to a specific key;

an acceptance unit that accepts a key operation of the specific key; and a control unit that, in a case that the acceptance unit accepts the key operation and the register unit registers the identification information corresponding to the specific key, transmits an issuance request for a read instruction to the information processing apparatus having the registered identification information, and in a case that the acceptance unit accepts the key operation and the register unit does not register the identification information corresponding to the specific key, displays a screen for selecting identification information to select an information processing apparatus.

2. A control method of controlling an image reading apparatus for reading an image and transmitting the read image data to an information processing apparatus in accordance with a read instruction issued from the information processing apparatus, the method comprising:

registering identification information of an information processing apparatus corresponding to a specific key;

accepting a key operation of the specific key;

in a case that the key operation is accepted and the identification information corresponding to the specific key is registered, transmitting an issuance request for a read instruction to the information processing apparatus having the registered identification information; and in a case the key operation is accepted and the identification information corresponding to the specific key is not registered, displaying a screen for selecting identification information to select an information processing apparatus.

3. The apparatus according to claim 1, further comprising;

a determination unit configured to determine whether or not the image reading apparatus is connected to the information processing apparatus having the identification information registered by the register unit, wherein the control unit displays the screen for selecting identification information to select an information processing apparatus in a case that the determination unit determines that the image reading apparatus is not connected to the information processing apparatus having the identification information registered by the register unit.

4. The apparatus according to claim 3, wherein the control unit displays the screen for selecting identification information to select an information processing apparatus in a case that the determination unit determines that the image reading apparatus is connected to a plurality of information processing apparatuses having the identification information registered by the register unit.

5. The apparatus according to claim 1, wherein the control unit transmits the issuance request for the read instruction to an information processing apparatus selected, by a user, via the screen.

6. The apparatus according to claim 1, wherein the register unit further registers interface information for specifying an interface connecting the image reading apparatus and an information processing apparatus in associated with the specific key.

7. The apparatus according to claim 6, wherein the interface information includes at least information indicating whether the interface is a USB interface or a network interface.

8. The apparatus according to claim 1, wherein the register unit further registers specific information for specifying a setting of reading an image in associated with the specific key.

9. The apparatus according to claim 8, wherein the specific information includes any one of a type of document in reading, a type of file for storing image data of a read image, a size of the document, a resolution in reading, a location at which the image data of a read image is to be stored and a name of the file for storing the image data.

10. The apparatus according to claim 1, further comprising an operation unit having a plurality of specific keys, wherein the register unit registers the identification information corresponding to a specific key selected among the plurality of specific keys.

11. A non-transitory computer-readable storage medium storing a program for causing a computer to function as the image reading apparatus defined in claim 1.

12. A non-transitory computer-readable storage medium storing a program for causing a computer to implement the method defined in claim 2.

13. The apparatus according to claim 1, wherein the screen displayed by the control unit is a screen for selecting identification from a list of identification information.

* * * * *